(12) United States Patent
Xiong et al.

(10) Patent No.: US 10,866,961 B2
(45) Date of Patent: Dec. 15, 2020

(54) DATA INTERACTION METHOD AND DEVICE THEREOF

(71) Applicant: UBTECH Robotics Corp, Shenzhen (CN)

(72) Inventors: Youjun Xiong, Shenzhen (CN); Lin Chen, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 567 days.

(21) Appl. No.: 15/715,164

(22) Filed: Sep. 26, 2017

(65) Prior Publication Data

US 2018/0336255 A1    Nov. 22, 2018

(30) Foreign Application Priority Data

May 19, 2017   (CN) .......................... 2017 1 0358867

(51) Int. Cl.
*G06F 16/00* (2019.01)
*G06F 16/25* (2019.01)
*G06F 16/2457* (2019.01)
*G06F 16/332* (2019.01)

(52) U.S. Cl.
CPC ...... *G06F 16/258* (2019.01); *G06F 16/24575* (2019.01); *G06F 16/3329* (2019.01)

(58) Field of Classification Search
CPC ...... G06F 16/3331; G06F 16/338; G06F 8/36; G06F 16/22; G06F 16/24575; G06F 16/25; G06F 16/258; G06F 16/3329; G06F 16/3337; G06F 16/41; G06F 16/951; G06F 16/9535; G06F 40/58
See application file for complete search history.

(56) References Cited

U.S. PATENT DOCUMENTS

| | | | | |
|---|---|---|---|---|
| 8,838,505 B2 * | 9/2014 | Jang | ................. | G06Q 10/06311 706/12 |
| 9,753,745 B1 * | 9/2017 | Guo | ....................... | G06N 7/005 |
| 10,513,038 B2 * | 12/2019 | Thapliya | ................ | B25J 11/008 |
| 10,714,081 B1 * | 7/2020 | Miller | ..................... | G10L 15/08 |
| 2013/0325839 A1 * | 12/2013 | Goddard | ............. | G06F 16/9537 707/708 |
| 2016/0162567 A1 * | 6/2016 | Olsson | ................... | G06Q 10/10 707/722 |
| 2017/0374176 A1 * | 12/2017 | Agrawal | ................ | H04W 12/06 |
| 2018/0225381 A1 * | 8/2018 | Loganathan | .......... | G06F 16/951 |
| 2019/0147001 A1 * | 5/2019 | Liu | ......................... | G10L 15/30 704/9 |
| 2020/0257996 A1 * | 8/2020 | London | .................... | G06N 5/04 |

* cited by examiner

*Primary Examiner* — Merilyn P Nguyen (57) ABSTRACT

The present disclosure relates to a data interaction method, including: receiving a search request from a service layer, and transmitting the search request to a search application server. The search application server is configured to manage the response data obtained from at least one third-party application. The method further includes receiving the response data transmitted from the search application server, and transmitting the response data to the service layer. As such, the time of accessing the third-party applications may be reduced, the data-accessing time may be reduced, and the data-accessing performance may be improved.

17 Claims, 5 Drawing Sheets

DATA INTERACTION METHOD AND DEVICE THEREOF

CROSS REFERENCE TO RELATED APPLICATIONS

This application claims priority to Chinese Patent Application No. 201710358867.8, filed May 19, 2017, which is hereby incorporated by reference herein in its entirety.

BACKGROUND

1. Technical Field

The present disclosure relates to communication field, and more particularly to a data interaction method.

2. Description of Related Art

With the evolution of the technology, a variety of robot-related applications have been developed along with human's daily life. The robot may understand human language, and may communicate with, the user in human language. The robot may be configured to analyze the situation, and to adjust the movement to satisfy the user demand. The robot may conduct a data access process to obtain the response via the third-party application interface, so as to understand the user request and to provide the third-party application service. However, the response time for the user request may be long when accessing the third-party application interface. Also, the data-accessing performance may be reduced when the process relates to a plurality of data interactions.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments. It should be noted that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device. In the ease that there are no more restrictions, an element qualified by the statement "comprises a . . . " does not exclude the presence of additional identical elements in the process, method, article or device that comprises the said element.

Solr is an independent enterprise-class search application server, which provides an application programming interface similar to the Web-service. Users may transmit an extensible markup language (XML) request to the Solr in a certain format via a hypertext transfer protocol (HTTP) to generate an index. The users may also transmit a search request by conducting HTTP GET operation and may obtain a response in XML format. The Solr is a high-performance, full-text search engine, which adopts Java5 development and a full-text search engine called Lucene. The Solr may provide a language querying system-much more abundant than the Lucene. The Solr is an excellent full-text search engine which is configurable and scalable. The Solr may optimize the query performance, and provide a perfect function management interface. The main features of the Solr may include: high performance, flexible cache function, and vertical search function. In addition, the Solr may highlight search results, and may improve availability by replication of the index.

Figure 1:
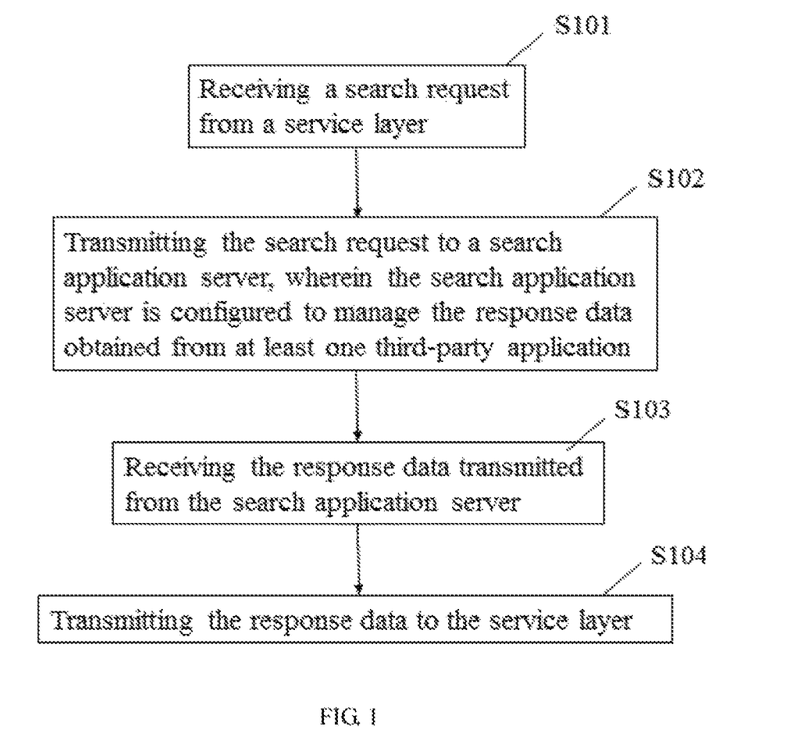
FIG. 1 is a flowchart illustrating a data interaction method in one embodiment of the preset disclosure.

As shown in FIG. 1, the present disclosure relates to a data interaction method, including the following steps.

In step S101: receiving a search request from a service layer.

When robots interact with users, the service layer is configured, to process the user instructions and to transmit the search request to the Solr to obtain response data satisfying the user instruction.

In step S102: transmitting the search request to a search application server, wherein the search application server is configured to manage the response data obtained from at least one third-party application.

A data layer is configured to transport the data between the service layer and the search application server, and to transmit the search request from the service layer to the Search application server. In one example, the search application server may be the Solr server. Service information obtained from the third-party application may be stored in at memory storage in advance. The Search application server may manage the third-party application and may obtain the response data satisfying the search request from the response data of the third-party application.

In step S103: receiving the response data transmitted from the search application server.

In step S104: transmitting the response data to the service layer.

The data layer receives the response data satisfying the search request from the Search application server and transmits the response data to the service layer.

The response data obtained from the third-party applications is managed by the Search application server. The service layer may transmit the search request to the data layer, and the data layer may transmit the search request to the Search application server to obtain the response data. The Search application server may conduct a searching process on the response data of the third-party applications, and may transmit the response data satisfying the condition to the data layer. The data layer may transmit the response data to the service layer to complete the data interaction. Such that, the times of accessing the third-party applications may be reduced, the data-accessing time may be reduced, and the data-accessing performance may be improved.

Figure 2:
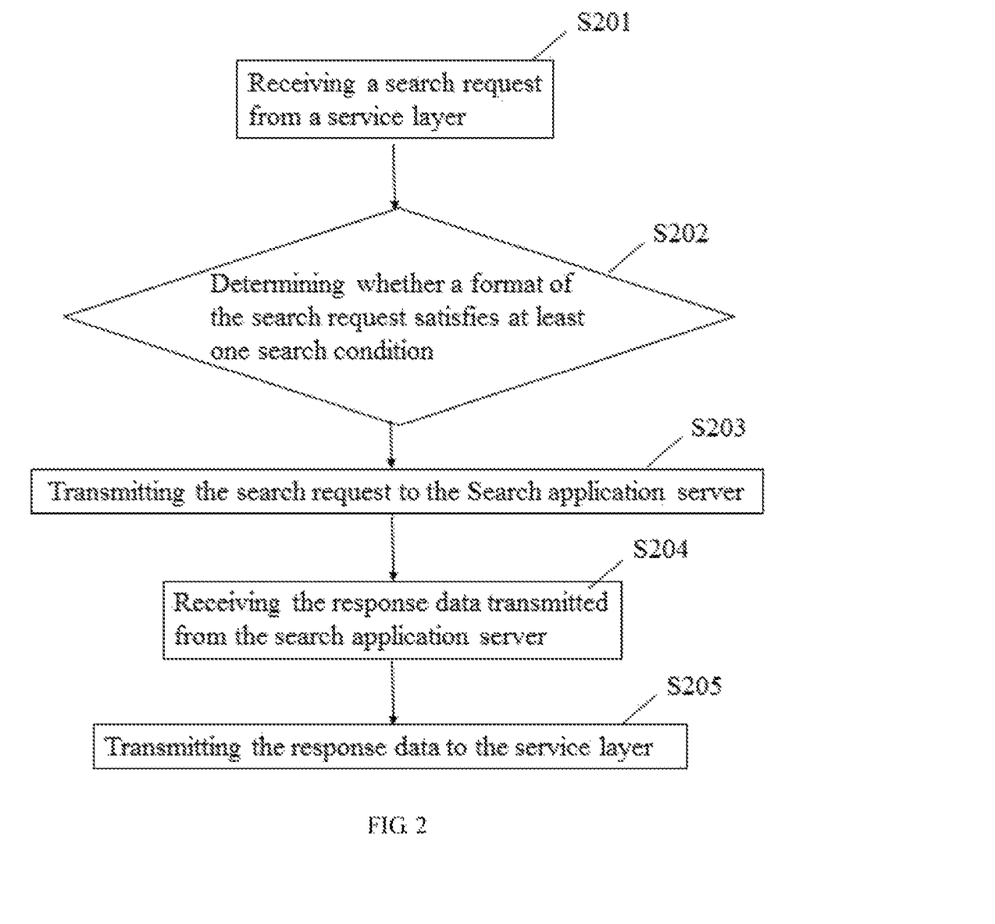
FIG. 2 is a flowchart illustrating a data interaction method in another embodiment of the preset disclosure.

In another aspect, as shown in FIG. 2, the present disclosure relates to the data interaction method, including the following steps.

In step S201: receiving the search request from the service layer.

The servicer layer is configured to transform the user instruction into a request text when the robot interacts with the user. The service layer is further configured to analyze and classify the request text and to integrate the request text, a machine identifier (ID), a field ID, and an intention ID into the search request. The data layer is configured to provide the response data to the service layer.

In step S202: determining whether a format of the search request satisfies at least one search condition.

The data layer may conduct a verifying process when receiving the search request from the service layer, so as to determine whether the format of the search request matches with the format of the Solr for conducting a searching process.

In step S203: transmitting the search request to the Search application server.

The search request is transmitted to the Search application server when the data layer determines that the format of the search request transmitted from the service layer satisfies the format to drive the Search application server to conduct the searching process.

In step S204: receiving the response data transmitted from the Search application server.

The response data may include the machine ID and a response text. Wherein the machine ID is configured to indicate a destination robot of the response data. The response text is an answer text corresponding to the instruction of the user.

In one example, the response data is stored in a buffer, a database, or a hardware disk, and the response data is managed by the Search application server. Some of the instructions may be frequently accessed and are directed to the third-party applications. The response data corresponding to such instructions are configured to be a static text, and the static text is stored in the buffer, the database, or the hardware disk, wherein the response data is obtained from the third-party application. The request text, the field ID, the intention ID, and the response text are stored in the buffer, the database, or the hardware disk, wherein the request text, the field ID, the intention ID, and the response test are of 1 bit. That is, the request text, the field ID, and the intention ID correspond to specific response text. The field ID indicates a field classification number which is set when the data is stored, wherein the data corresponds to the field of the request text. The intention ID indicates the intention classification number which is set when the data is stored, wherein the data corresponds to the intention related to the request text. The Search application server may obtain the response data from the buffer, the database, or the hardware disk, and may determine a priority of the storage when obtaining the response data. The buffer has a highest priority, and the hardware disk has a lowest priority. The buffer is configured to be a buffer region for data exchanging. When the Search application server searches the data, firstly the buffer may be accessed to. The operation speed of the buffer is fast, such that, the data-accessing time may be reduced. The data stored in the database is comprehensive, so that the operation speed for obtaining the data from the database is slower than the speed of obtaining the data from the buffer. The operation speed of the hardware disk is the slowest, so that the data-accessing time may be the longest. As such, if the response data satisfying the search request has been stored in the buffer, the database, and the hardware disk at the same time, the Search application server may access to the storage having the highest priority to obtain the response data.

In step S205: transmitting the response data to the service layer.

The data layer receives the response data transmitted from the Search application server, wherein the response date satisfies the search request, and the data layer may transmit the response data to the service layer.

In view of the above, the response data of the third-party applications may be managed by the Search application server, and the service layer may transmit the search request to the data layer. The data layer may transmit the search request to the Search application server to obtain the response data. The Search application server may conduct the searching process on the response data of the third-party applications, and may transmit the response data satisfying the condition to the data layer. The data layer may transmit the response data to the service layer to complete the data interaction. Such that, the times of accessing the third-party applications may be reduced, the data-accessing time may be reduced, and the data-accessing performance may be improved.

Figure 3:
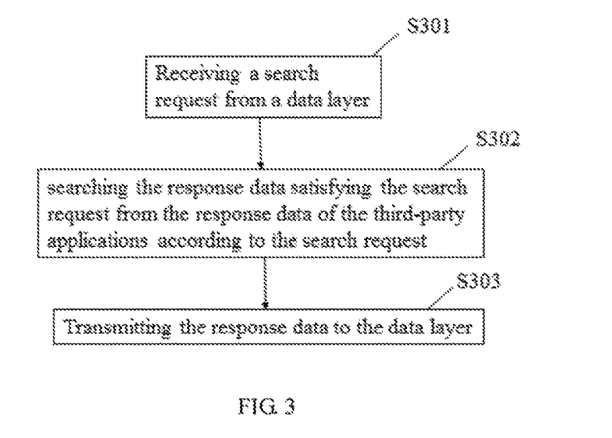
FIG. 3 is a flowchart illustrating a data interaction method in another embodiment of the preset disclosure.

In another aspect as shown in FIG. 3, the present disclosure relates to the data interaction method, including the following steps.

In step S301: receiving the search request from the data layer.

In step S302; searching the response data satisfying the search request from the response data of the third-party applications according to the search request.

The Search application server is configured to manage the response data of the third-party applications, receive the search request transmitted from the data layer, and conduct the searching process on the response data of the third-party application according to the search request to obtain the corresponding response data.

In step S303: transmitting the response data to the data layer.

The Search application server may transmit the corresponding response data satisfying the search request to the data layer, and the data layer may transmit the corresponding response data to the service layer.

In view of the above, the response data of the third-party applications is managed by the Search application server, and the service layer may transmit the search request to the data layer. The data layer may transmit the search request to the Search application server to obtain the response data. The Search application server may conduct the searching process on the response data of the third-party applications, and may transmit the response data satisfying the condition to the data layer. The data layer may transmit the response data to the service layer to complete the data interaction. Such that, the times of accessing the third-party applications may be reduced, the data-accessing time may be reduced, and the data-accessing performance may be improved.

Figure 4:
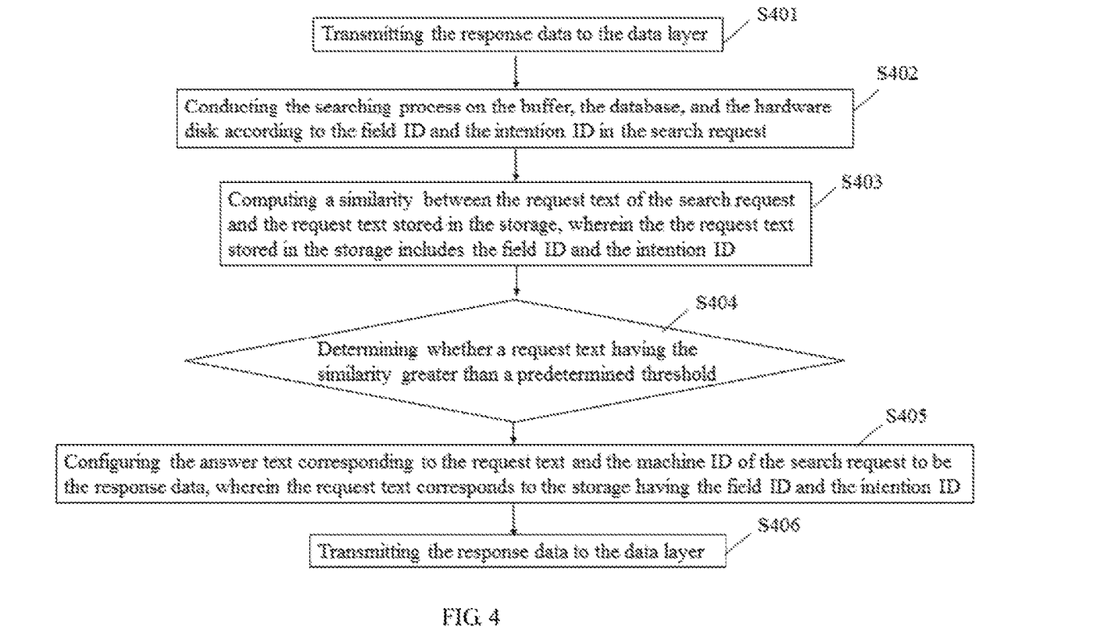
FIG. 4 is a flowchart illustrating a data interaction method in another embodiment of the preset disclosure.

In another aspect, as shown in FIG. 4, the present disclosure relates to the data interaction method, including the following steps.

In step S401: receiving the search request from the data layer.

The Search application server is configured to manage the data, receive the search request transmitted from the data layer, wherein the search request may include the request text, the machine ID, the field ID, and the intention ID. The Search application server may obtain the corresponding response data according to the search request.

In step S402: conducting the searching process on the buffer, the database, and the hardware disk according to the field ID and the intention ID in the search request.

Before the Search application server obtains the data, the Search application server may conduct, the searching process on the data managed by the Search application server according to the field ID and the intention ID of the search request, so as to reduce the searching range and to reduce the time for obtaining the response data. The storage may store the response data of the third-party application. Some of the instructions are frequently used and have to request the third-party application. The response data corresponding to the instructions are configured to be the static text, and the static text is stored in the storage, as such, the Search application server may be configured to manage the data, and the data-accessing time may be reduced when the Search application server has to access to the third-party application, so as to improve the data-accessing performance. In one example, the storage may include the buffer, the database, or the hardware disk. The Search application server may determine the priority of the storage when obtaining the response data. The buffer has the highest priority, and the hardware disk has the lowest priority. The buffer is configured to be the buffer region for data exchanging. When the Search application server is searching the data, firstly the buffer may be accessed to. The operation speed of the buffer is the fastest, such that, the data-accessing time may be reduced. The data stored in the database is comprehensive, so that the operation speed for obtaining the data from the database is slower than obtaining the data from the buffer. The operation speed of the hardware disk is the slowest, so that the data-accessing time may be the longest. As such, if the response data satisfying the search request has been stored in the buffer, the database, and the hardware disk at the same, time, the Search application server may access to the storage having, the highest priority to obtain the response data.

In step S403: computing a similarity between the request text of the search request and the request text stored, in the storage, wherein the the request text stored in the storage includes the field ID and the intention ID.

The Search application server may conduct the searching process according to the field ID and the intention ID to reduce the searching range, and may compute the similarity between the request text of the search request and the request text stored in the storage, wherein the request text stored in the storage includes the field ID and the intention ID. The request text of the search request may be configured to be a conversation between the user and the robot or the instruction requested from the user to the robot. However, the service layer may go wrong when conducting a semantic analysis on the conversation and on the instruction. For example, if the user speaks too fast, number of words obtained by the service layer by conducting the semantic analysis may be less than a real number of the words. Or if the pronunciation of the user is not accurate, the request text obtained by the service layer by conducting the semantic analysis may be different from a real request text. The difference may include the expression differences between the operation instruction of the user and the request text stored in the storage, such as, the difference between "How . . . " and "Why . . . ". Therefore, the request text of the search request may be different from the real instruction that user requests, i.e. the request text stored in the storage. So that, the Search application server may conduct the similarity-computing process on the request test, of the search request and the request text stored in the storage before the Search application server obtains the response data.

In step S404: determining whether a request text having the similarity greater than a predetermined threshold. If the request test having the similarity greater than, the predetermined threshold exists in the storage, the process goes to S405.

In step S405: taking the answer text corresponding to the request test and the machine ID of the search request as the response data, wherein the request text is from the storage having the field ID and the intention ID, The request text, the field ID, the intention ID, and the response text are stored in the buffer, the database, or the hardware disk, wherein the request text, the field ID, the intention ID, and the response test are of 1 bit. That is, the request text, the field ID, and the intention ID correspond, to one response text. When the Search application server determines the request test having the similarity greater than the predetermined threshold, the Search application server may obtain the corresponding response text, and the Search application server may configure the machine ID in the search request and the obtained response text to be the response data. Wherein, the machine ID is configured to indicate the corresponding robot that the response data is returned to, and the response text is the answer text corresponding to the instruction of the user.

In step S406: transmitting the response data to the data layer.

If the response data is obtained from the database or the hardware disk, updating the response text of the response data, the field ID and the intention ID corresponding to the search request, and the request text to the buffer. As such, if the service layer transmits the same search request again, the response data may be obtained directly from the buffer, so as to improve the data-accessing performance.

In view of the above, the response data of the third-party applications is managed by the Search application server, and the service layer may transmit the search request to the data layer. The data layer may transmit the search request to the Search application server to obtain the response data. The Search application server may conduct the searching process on the response data of the third-party applications, and may transmit the response data satisfying the condition to the data layer. The data layer may transmit the response data to the service layer to complete the data interaction. Such that, the times of accessing the third-party applications may be reduced, the data-accessing time may be reduced, and the data-accessing performance may be improved.

Figure 5:
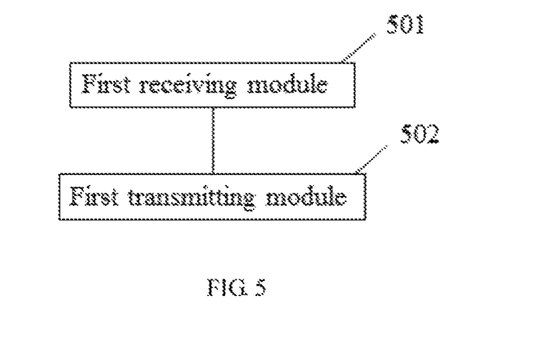
FIG. 5 is a flowchart illustrating a data interaction method in another embodiment of the preset disclosure.

In another aspect, as shown in FIG. 5, the present disclosure relates to data interacting device, including a first receiving module 501 and a first transmitting module 502.

The first receiving module 501 is configured to receive the search request transmitted from the service layer. The first transmitting module 502 is configured to transmit the search request to the search application server. The search application server is configured to manage the response data of the third-party application. The search application server may conduct the searching process on the response data according to the search request, and may transmit the obtained response data to the first receiving module 501. The first receiving module 501 may receive the response data transmitted from the search application server, and the first transmitting module 502 may transmit the the response data to the service layer.

In view of the above, the data interacting device may complete the interaction of the data between the data layer and the service layer. Such that, the times of accessing the third-party applications may be reduced, the data-accessing time may be reduced, and the data-accessing performance may be improved.

Figure 6:
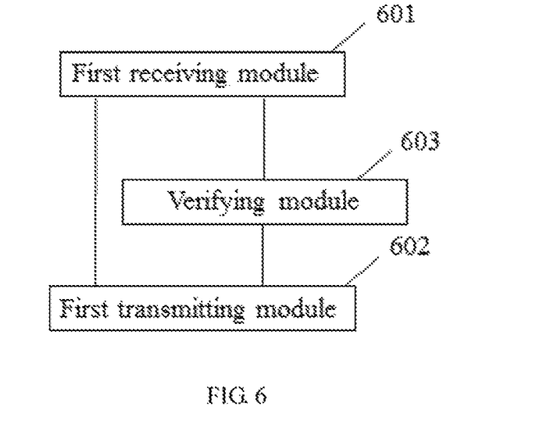
FIG. 6 is a flowchart illustrating a data interaction method in another embodiment of the preset disclosure.

In another example, as shown in FIG. 6, the present disclosure relates to the data interacting device, including the first receiving module 601, the first transmitting module 602, and a verifying module 603. The first receiving module 601 is configured to receive the search request transmitted from the service layer. The verifying module 603 configured to verity whether the format of the search request satisfies the search condition. If the format of the search request satisfies the search condition, the first transmitting module 602 may transmit the search request to the search application server. The search application server is configured to manage the response data of the third-party application. The search application server may conduct the searching process on the response data according to the search request, and may transmit the obtained response data to the first receiving module 601. The first receiving module 601 may receive the response data transmitted from the search application server, and the first transmitting module 602 may transmit the the response data to the service layer.

In view of the above, the data interacting device may complete the interaction of the data between the data layer and the service layer. Such that, the times of accessing the third-party applications may be reduced, the data-accessing time may be reduced, and the data-accessing performance may be improved.

Figure 7:
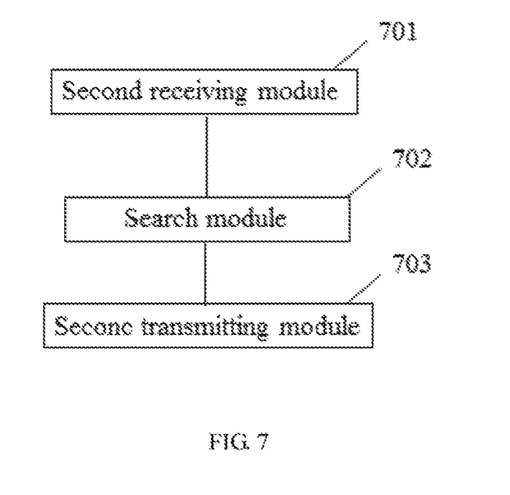
FIG. 7 is a flowchart illustrating a data interaction method in another embodiment of the preset disclosure.

In another example, as shown in FIG. 7, the present disclosure relates to the data interacting device, including a second receiving module 701, a search module 702, and a second transmitting module 703.

The second receiving module 701 is configured to receive the search request transmitted from the data layer. The search module 702 is configured to search the response data satisfying the search request from the response data stored in the third-party application according to the search request. The second transmitting module 703 is configured to transmit the response data to the data layer.

The search module 702 is configured to determine whether the response data satisfying the search request has been stored in the buffer, if the response data satisfying the search, request has not been stored in the buffer, the search module 702 is configured to determine whether the response date corresponding to the search request has been stored in the database. If the response data corresponding to the search request has not been stored in the database, the search module 762 may search the response data, corresponding to the search request from the hardware disk.

In view of the above, the data interacting device may complete the interaction of the data between, the data layer and the service layer. Such that, the times of accessing the third-party applications may be reduced, the data-accessing time may be reduced, and the data-accessing performance may be improved.

Figure 8:
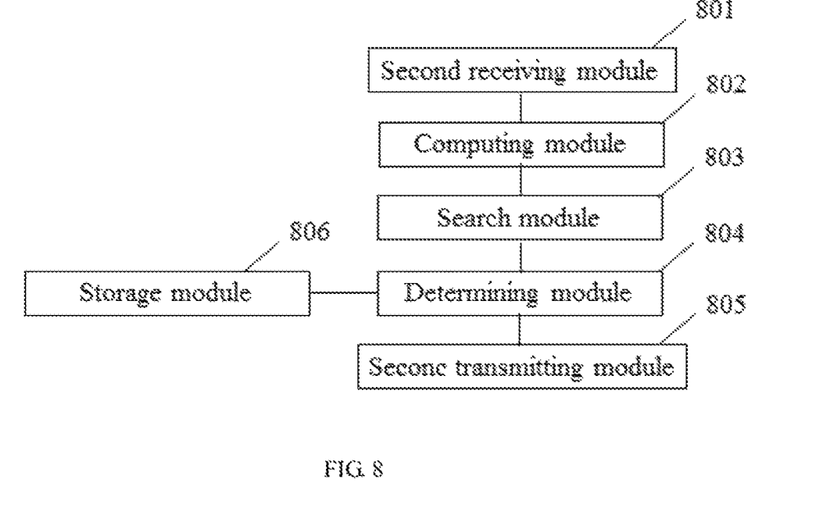
FIG. 8 is a flowchart illustrating a data interaction method in another embodiment of the preset disclosure.

In another example, as shown in FIG. 8, the present disclosure relates to the data interacting device, including the second receiving module 801, the search module 802, a computing module 803, a determining module 804, the second transmitting module 805, and a storage module 806.

The second receiving module 801 is configured to receive the search, request transmitted from the data layer. The search module 802 is configured to search the response data satisfying the search request form the response data of the third-party applications according to the search request. Wherein the search request may include the request request, the machine ID, the field ID, and the intention ID. The search module 802 may conduct the searching process according to the field ID and the intention ID. The computing module 803 is configured to compute the similarity between the request text of the search request and the request text obtained from the storage. The determining module 804 is configured to determine the similarity is greater than the threshold value. If the similarity is greater than the threshold value and the request text is obtained from the database or the hardware disk, the storage module 806 may update the obtained request text, the field ID and the intention ID corresponding to the obtained request text, and the answer text to the buffer, wherein the request test, the field ID, and the intention ID correspond to the request text. Such that, the data-accessing time may be reduced, and the data-accessing performance may be improved when the same request text is requested next time. The second transmitting module 805 is configured to transmit the response data to the data layer, wherein the response data may include the machine ID and the answer text.

In view of the above, the data interacting device may complete the interaction of the data between the data layer and the service layer. Such that, the times of accessing the third-party applications may be reduced, the data-accessing time may be reduced, and the data-accessing performance may be improved.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A data interaction method, comprising:
  receiving a search request from a service layer, wherein the search request comprises a request text, a field ID, and an intention ID;
  transmitting the search request to a search application server, wherein the search application server is configured to manage response data of at least one third-party application, and the response data of at least one third-party application is obtained from the at least one third-party application, and corresponds to instructions accessed and directed to the at least one third-party application;
  receiving response data transmitted from the search application server, wherein received response data is searched from the response data of at least one third-party application according to the request text, the field ID, and the intention ID; and
  transmitting the received response data to the service layer;
  wherein the search request further comprises a machine ID, and wherein the request text is configured to be a conversation between a user and a robot or an instruction requested from the user to the robot.

2. The data interaction method according to claim 1, wherein the method further comprises:
  verifying whether a format of the search request satisfies a search condition; and transmitting the search request to the search application server upon determining the format of the search request satisfies the search condition.

3. The data interaction method according to claim 1, wherein the received response data comprises the machine ID and an answer text.

4. The data interaction method according to claim 3, wherein the received response data are searched from storages in sequence based on priority, the storages comprises a buffer, a database, and a hardware disk, the buffer has a highest priority, and the hardware disk has a lowest priority; and the received response data are obtained by accessing to a storage having the highest priority, in response to the received response data being stored in the buffer, the database, and the hardware disk at the same time.

5. The data interaction method according to claim 4, wherein the request text, the field ID, the intention ID, and the answer text stored in the buffer, the database, or the hardware disk are of 1 bit; and the request text, the field ID, and the intention ID correspond to one answer text.

6. The data interaction method according to claim 1, wherein the service layer transforms a user instruction into the request text when the robot interacts with the user, analyzes and classifies the request text, and integrates the request text, the machine ID, the field ID, and the intention ID into the search request; and the machine ID is configured to indicate a destination robot of the received response data, and the answer text corresponds to the user instruction.

7. The data interaction method according to claim 1, wherein the field ID indicates a field classification number which is set when a first data is stored, and the first data corresponds to a field of the request text; and the intention ID indicates a intention classification number which is set when a second data is stored, and the second data corresponds to an intention related to the request text.

8. A data interaction method, comprising:

receiving a search request from a data layer, wherein the search request comprises a request text, a field ID, and an intention ID;

searching response data satisfying the search request from response data of at least one third-party application according to the request text, the field ID, and the intention ID in the search request, wherein the response data of at least one third-party application is obtained from the at least one third-party application, and corresponds to instructions accessed and directed to the at least one third-party application; and transmitting the response data satisfying the search request to the data layer;

wherein the search request further comprises a machine ID, and wherein the request text is configured to be a conversation between a user and a robot or an instruction requested from the user to the robot.

9. The data interaction method according to claim 8, wherein the step of searching the response data satisfying the search request from the response data of at least one third-party application according to the request text, the field ID, and the intention ID in the search request comprises:

determining whether the response data satisfying the search request has been stored in a buffer, in a database, or in a hardware disk in sequence, according to the request text, the field ID, and the intention ID.

10. The data interaction method according to claim 9, wherein the method further comprises:

updating the search request and the response data satisfying the search request to the buffer when the response data satisfying the search request is obtained from the database or the hardware disk.

11. The data interaction method according to claim 8, wherein the response data satisfying the search request comprises the machine ID and an answer text.

12. The data interaction method according to claim 11, wherein the step of searching the response data satisfying the search request from the response data of at least one third-party application according to the request text, the field ID, and the intention ID in the search request comprises:

conducting a searching process according to the field ID and the intention ID in the search request;

computing a similarity between the request text of the search request and a request text obtained from a storage;

determining whether the similarity is greater than a predetermined threshold; and configuring a obtained answer text corresponding to the request text obtained from the storage to be the response data satisfying the search request, in response to determining the similarity is greater than the predetermined threshold.

13. A data interaction device, comprising:

one or more processors; and a memory; and one or more programs;

wherein the one or more programs are stored in the memory and configured to be executed by the one or more processors, the one or more programs comprise:

instructions for receiving a search request from a data layer, wherein the search request comprises a request text, a field ID, and an intention ID;

instructions for searching response data satisfying the search request from response data of at least one third-party application according to the request text, the field ID, and the intention ID in the search request, wherein the response data of at least one third-party application is obtained from the at least one third-party application, and corresponds to instructions accessed and directed to the at least one third-party application: and instructions for transmitting the response data satisfying the search request to the data layer;

wherein the search request further comprises a machine ID, and wherein the request text is configured to be a conversation between a user and a robot or an instruction requested from the user to the robot.

14. The data interaction device according to claim 13, wherein the one or more programs further comprise instructions for determining whether the response data satisfying the search request has been stored in a buffer, in a database, or in a hardware disk in sequence.

15. The data interaction device according to claim 14, wherein the one or more programs further comprise instructions for:

updating the search request and the response data satisfying the search request to the buffer when the response data satisfying the search request is obtained from the database or the hardware disk.

16. The data interaction device according to claim 13, wherein the response data satisfying the search request comprises the machine ID and an answer text.

17. The data interaction device according to claim 16, wherein the one or more programs further comprise instructions for:
- conducting a searching process according to the field ID and the intention ID in the search request;
- computing a similarity between the request text of the search request and a request text obtained from the storage;
- determining whether the similarity is greater than a predetermined threshold; and
- configuring a obtained answer text corresponding to the request text obtained from the storage to be the response data satisfying the search request, in response to determining the similarity is greater than the predetermined threshold.

* * * * *